United States Patent [19]

Puppel et al.

[11] 4,320,827
[45] Mar. 23, 1982

[54] CHAIN CONVEYOR

[76] Inventors: Alfred Puppel, Kaiser-Wilhelm-Allee 10, 5600 Wuppertal-1; Hans H. Dalferth, Eifelstrasse 21, 7080 Aalen-Wasseralfingen, both of Fed. Rep. of Germany

[21] Appl. No.: 159,193

[22] Filed: Jun. 13, 1980

[30] Foreign Application Priority Data

Jun. 19, 1980 [DE] Fed. Rep. of Germany ....... 2925046

[51] Int. Cl.³ ............................................. B65G 19/24
[52] U.S. Cl. .................................................. 198/731
[58] Field of Search ................ 198/712, 731, 844, 728

[56] References Cited

FOREIGN PATENT DOCUMENTS 2102207 8/1972 Fed. Rep. of Germany ...... 198/731
2413661 10/1974 Fed. Rep. of Germany ...... 198/731

*Primary Examiner*—James L. Rowland
*Attorney, Agent, or Firm*—Parmelee, Johnson, Bollinger & Bramblett

[57] ABSTRACT

For fixing conveyor elements (7) to the chain strands (5, 6) in a chain conveyor having two chain strands (5, 6) running over sprockets (1, 3), pairs of projections (11, 12) are used which grip one chain link (10) in each case and which, on assembly or dismantling of the conveyor elements (7), can move relative to one another on the tensioned chain strands (5, 6) but are locked by fixing bolts (18) when in the operating position and which have an arcuate outline on the sides facing the fronts (8, 9) of the particular chain link (10) gripped.

11 Claims, 16 Drawing Figures

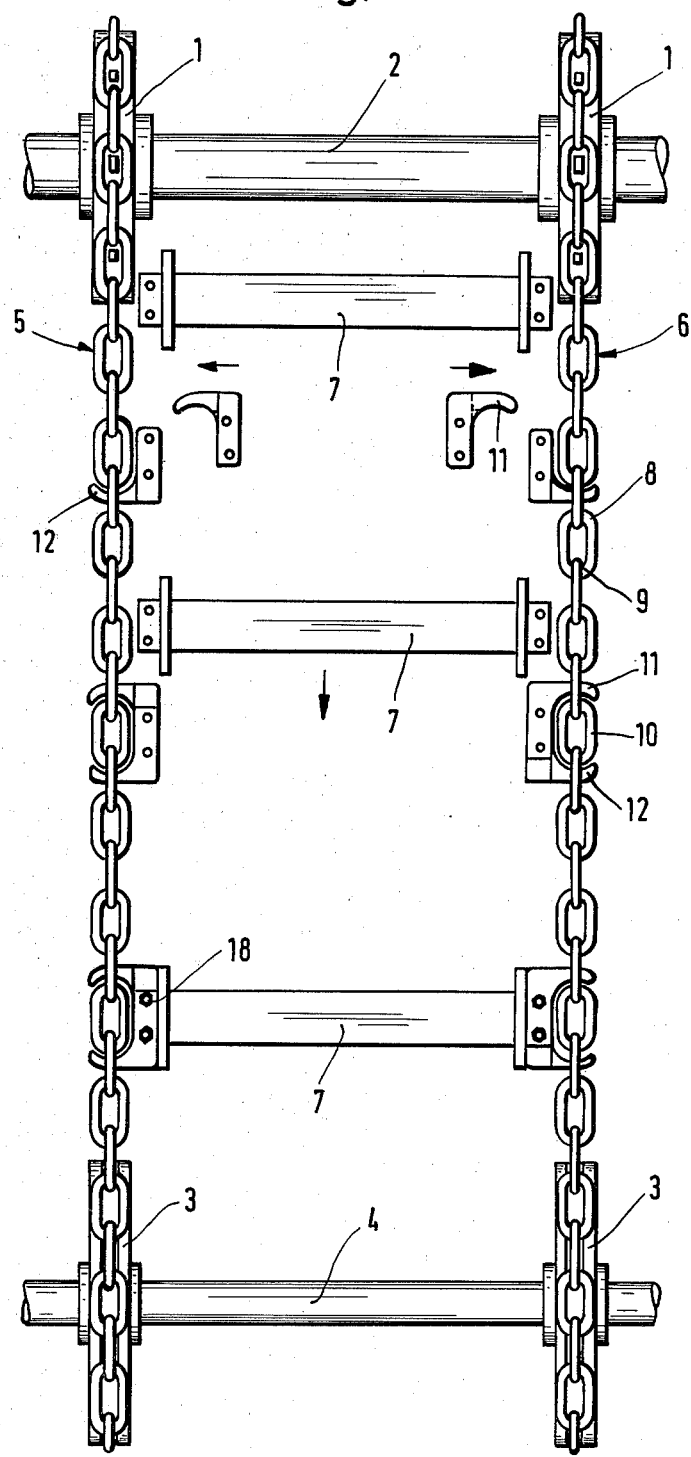

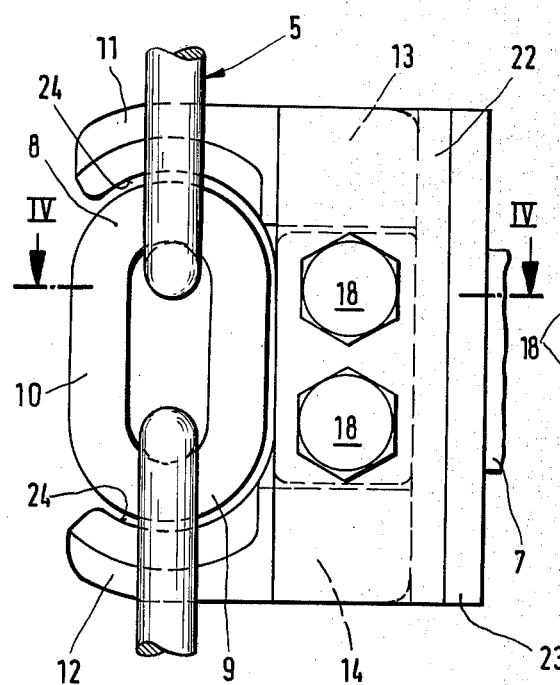
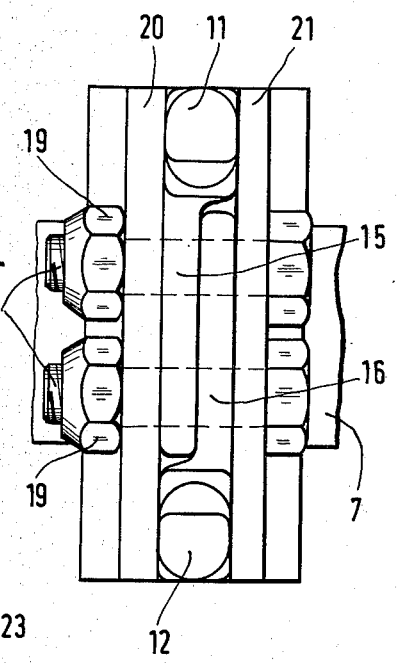
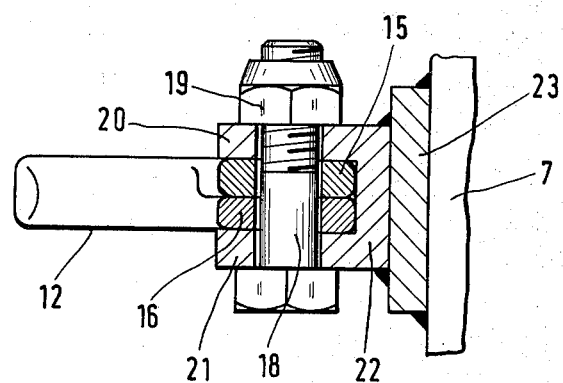

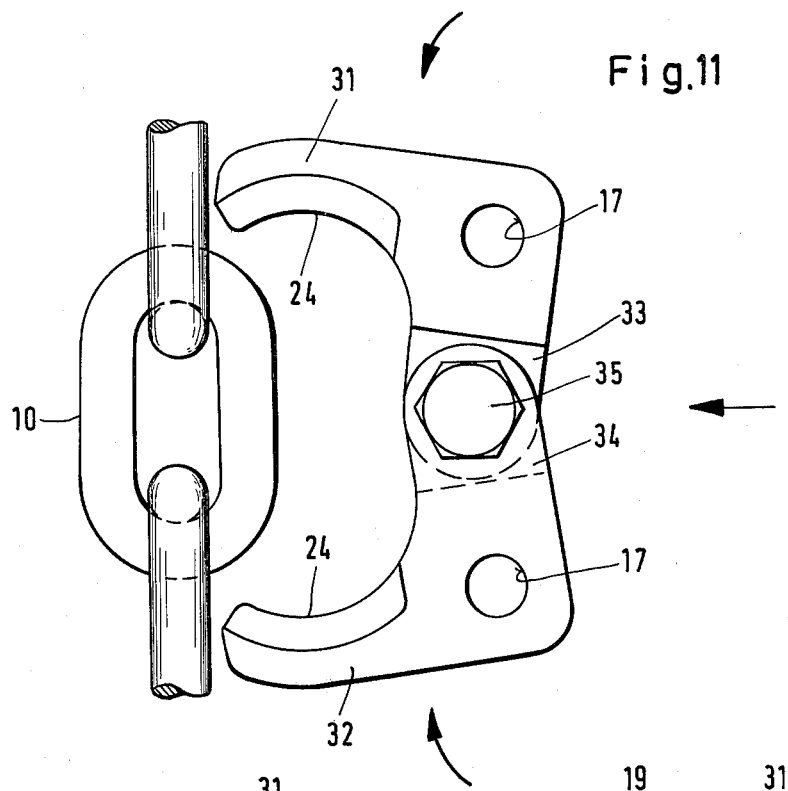
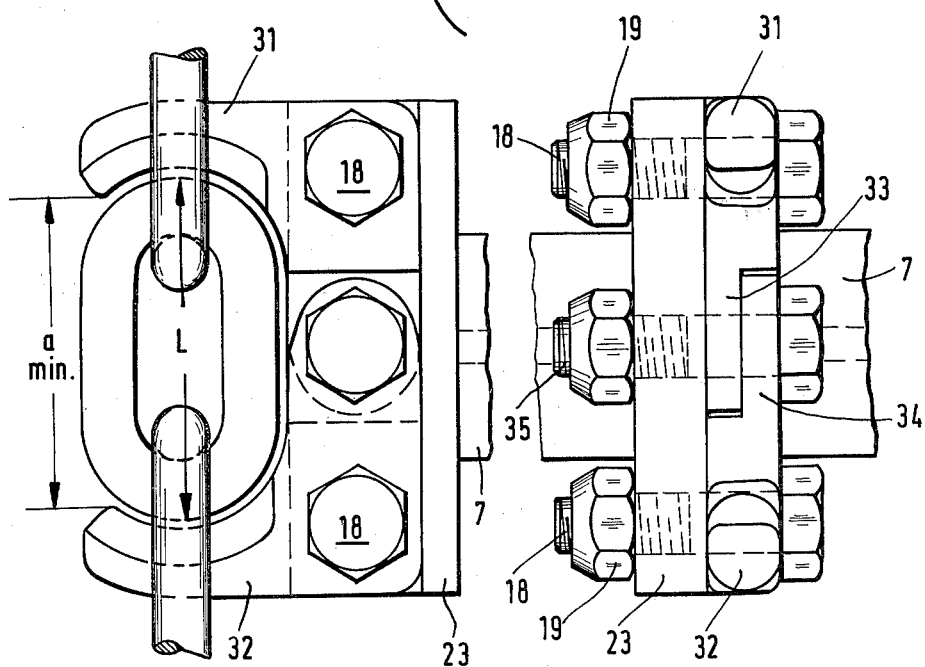

CHAIN CONVEYOR

The invention relates to a chain conveyor having at least two chain strands, formed from oval chain links and running over sprockets, and conveyor elements which are connected to the chain strands via pairs of projections which engage in the free inner space between two successive chain links oriented perpendicular to the sprocket axis, the shortest distance $a_{min}$ between the free ends of the projections, which can be mounted without releasing the tension of the chain strands, of each pair of projections in the operating position being smaller than the length L of the particular chain link gripped by the projections in the manner of a fork, and one of the projections having an arcuate outline on the side facing a front of this chain link.

A chain conveyor of the above type is known from German Offenlegungsschrift No. 2,413,661, wherein in each case a projection formed by a cylindrical bolt and a projection having an arcuate outline are fixed to a carrier. When assembling this chain conveyor, initially the carriers with the projections are pivoted in each case into two successive chain links oriented perpendicular to the axes of the sprockets and, subsequently, conveyor elements, such as scrapers, buckets or the like, are connected to the carriers suspended in the chain strands.

The known chain conveyor cannot be fully satisfactory inasmuch as it can be fully loaded in only one direction of revolution, or reverse running under full load entails problems, because the projections formed by the cylindrical bolt are less suitable than the projections having an arcuate outline for the transmission of large drive forces. Moreover, in the case of a chain running off a sprocket, it is not possible, in the case of the known chain conveyor, reliably to prevent a separation of the conveyor elements from the chain strands.

It is the object of the invention to provide a chain conveyor of the type under consideration, which is fully reversible, that is to say which operates perfectly both in forward running and reverse running, and in which the conveyor elements are connected to the chain strands in such a way that they cannot be lost.

According to the invention, this object is achieved when the projections gripping one chain link in each case are formed by parts which can move relative to one another during assembly but are locked when in the operating position, and the second projection also has an arcuate outline on its side facing the other front of the chain link. The chain conveyor according to the invention has the advantage that therein the projections reliably grip around the chain links enclosed by them and that equally favourable force transmission conditions between the particular chain links enclosed and the projections associated therewith apply both in forward running and reverse running, without having to forgo the advantageous facility for assembly and dismantling, without loosening the chain strands.

Assembly of the projections is simple when the root ends of these are provided with flanges for fixing them to one conveyor element in each case, each flange preferably having bores which serve to receive fixing bolts.

In the following text, the invention is explained in more detail by reference to the attached drawings in which:

FIG. 1 shows a plan view of the essential parts of a chain conveyor with three conveyor elements shown in different assembly positions;

FIG. 2 shows a plan view of a junction between a chain strand and a conveyor element, on a scale enlarged relative to FIG. 1;

FIG. 3 shows a front view of the junction, with the chaim omitted;

FIG. 4 shows a section along the line IV-IV in FIG. 2;

FIG. 11 shows the introduction of two projections into a chain strand;

FIG. 12 shows a plan view of a junction, with completely assembled projections according to FIG. 11;

FIG. 13 shows a front view of the junction according to FIG. 12, with the chain strand omitted;

Figure 7:
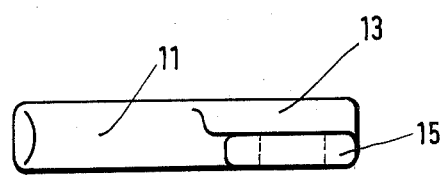
FIG. 7 shows a view of the projection according to FIG. 5, seen in the direction of the arrow VII in FIG. 5.
Figures 5, 6:
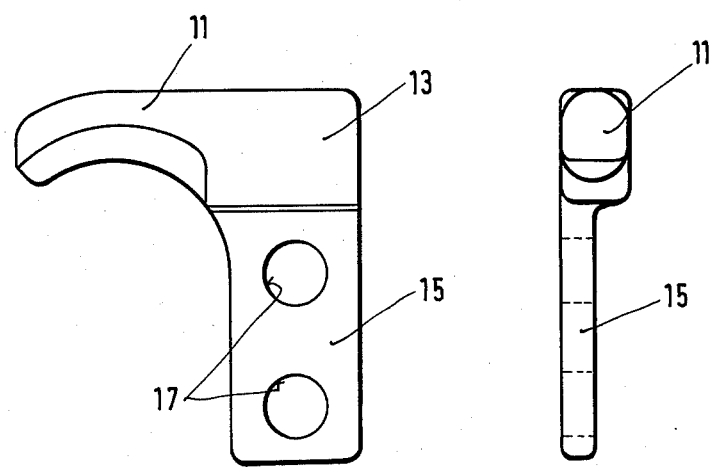
FIG. 5 shows a plan view of an individual projection provided with a flange.
FIG. 6 shows a front view of the projection according to FIG. 5.

In FIG. 1, two toothed sprockets arranged on an axis 2 are marked 1 and two grooved sprockets arranged on an axis 4 are marked 3, two chain strands 5 and 6, which serve to drive conveyor elements 7, being guided over these sprockets. The lowest of the conveyor elements shown has been completely assembled, whilst the two upper conveyor elements are shown in different phases of assembly.

Details of the connection of the conveyor elements 7 to the chain strands 5 and 6 are shown in FIGS. 2–7. As can be seen, the fronts 8 and 9 of a chain link 10 are surrounded in the manner of a fork by two projections 11 and 12. In the region of its root end 13 or 14, each of these projections is provided with a flange 15 or 16 respectively. Each flange has two bores 17 in each case for receiving fixing bolts 18 which are associated with nuts 19. On assembly of the conveyor elements, the projections 11 and 12 are moved apart to such an extent that they can be introduced into the free inner spaces of the chain links adjacent to the chain link 10. It is not necessary to release the tension of the chain strands 5, 6. Subsequently, the projections and the flanges are moved towards one another until the bores 17 provided in the flanges 15, 16 are in alignment and the fixing bolts 18 are introduced into the bores. With the aid of the fixing bolts 18 and the nuts 19, it is possible to clamp the flanges 15 and 16 in between the arms 20 and 21 of a U-shaped holding rail 22. The holding rail 22 is welded to a carrier 23 which in turn is joined by welding to the conveyor element 7.

The type of assembly "from the inside out", as described, is particularly suitable in cases where the chain strands between the sprockets are guided in U-profile rails, the open sides of which face one another.

As can be seen particularly from FIG. 2, the sides 24 having arcuate outlines, together with the surfaces, facing the chain link 10, of the flanges 15 and 16 securely enclose the chain link 10. Identical force transmission conditions are obtained in both forward running and reverse running as a result of the shaping of the sides 24 as centering recesses for the chain link 10. Consequently, the chain conveyor described is fully reversible.

Figure 8:
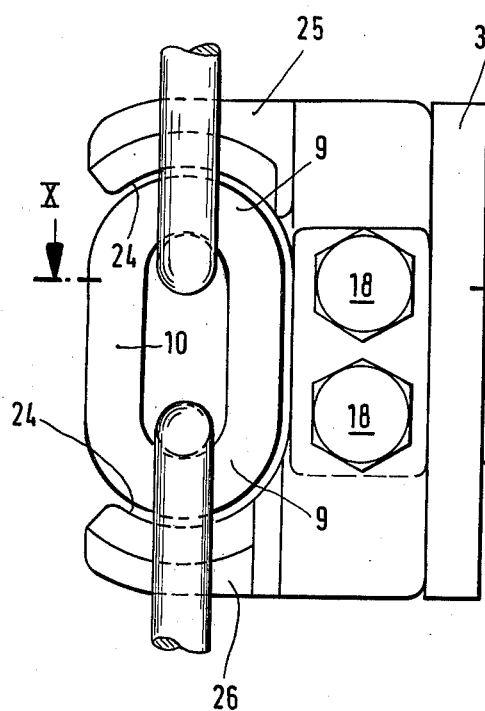
FIG. 8 shows a plan view of a junction of modified design.
Figure 9:
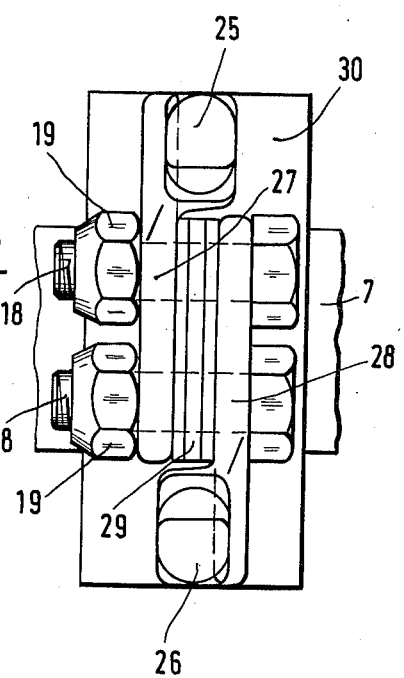
FIG. 9 shows a front view of the junction according to FIG. 8, with the chain strand omitted.
Figure 10:
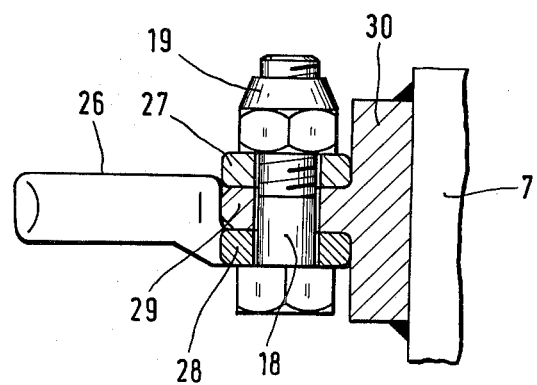
FIG. 10 shows a section along the line X-X in FIG. 8.

FIGS. 8–10 show a modified fixing arrangement which largely corresponds to the solution described above. In this case also, projections 25 and 26 with flanges 27 and 28 are used. In this case, the flanges 27 and 28 are fixed by means of fixing bolts 18 and nuts 19 to the longitudinal web 29 of a holding rail 30 which is welded to a conveyor element 7.

Assembly of the projections 25 and 26 is carried out in a manner which in principle is the same as that for assembling the projections 11 and 12. In this case also, the shaped sides 24 of the projections 25 and 26 securely enclose the chain link 10 in the assembled state.

FIGS. 11–13 show a fixing arrangement with projections 31 and 32, the flanges 33 and 34 of which are mounted to be pivotable about the shank of a fixing bolt 35. This means that, for purposes of assembly, the projections 31 and 32 can be temporarily splayed (compare FIG. 11). After the projections have been introduced in the splayed state into the chain links adjacent to the chain link 10, the splaying is reversed and fixing bolts 18 are introduced into the bores 17 which are aligned with bores in a carrier 23 which is rigidly joined to a conveyor element 7.

Figure 14:
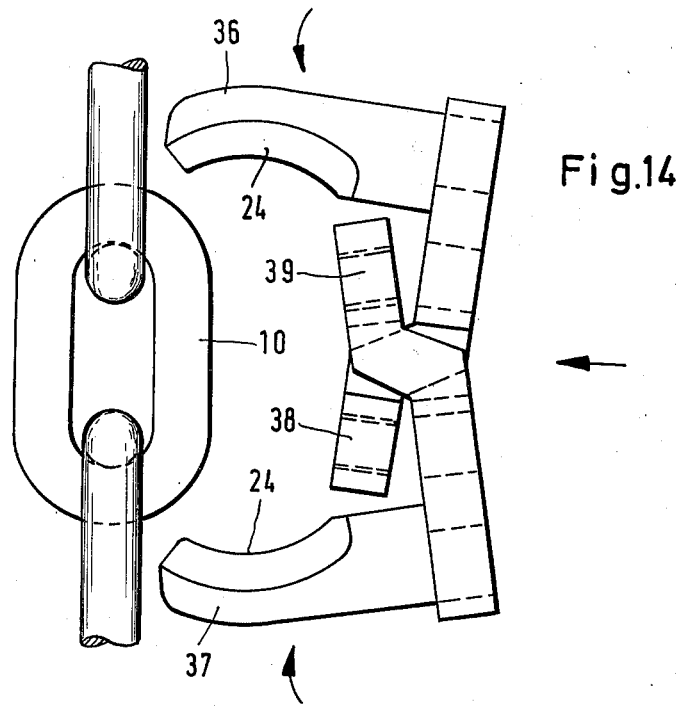
FIG. 14 shows the introduction of two projections of modified design into a chain strand.
Figures 15, 16:
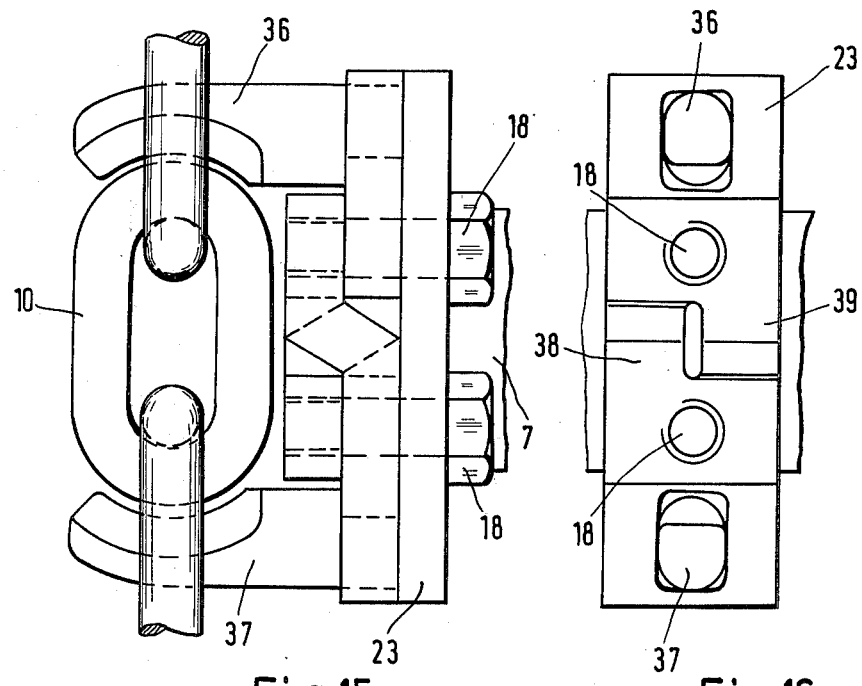
FIG. 15 shows the completely assembled junction with projections according to FIG. 14
FIG. 16 shows a front view of the junction according to FIG. 15, with the chain strand omitted.

FIGS. 14–16 also show a fixing arrangement with splayable projections 36. In this design, the projections are fitted with flanges 38 and 39, the shape of which is selected such that only two fixing bolts 18 are required for fixing the projections to a carrier.

In all cases—as shown in FIG. 12—the shortest distance $a_{min}$ between the free ends of the projections 31, 32 of each pair of projections in the operating position is smaller than the length L of the particular chain link 10 gripped by the projections in the manner of a fork.

We claim:

1. A chain conveyor having at least two chain strands, formed from oval chain links and running over sprockets, and conveyor elements which are connected to the chain strands via pairs of projections which engage in the free inner space of two successive chain links oriented perpendicular to the sprocket axis, the space between said two successive chain links orientated perpendicular to the sprocket axis being occupied by an intermediate chain link (10) positioned between the free ends of said projections, the shortest distance $a_{min}$ between the free ends of said projections, which can be mounted without releasing the tension of the chain strands, of each pair of projections in the operating position being smaller than the length L of the intermediate chain link gripped by the projections, one of the projections having an arcuate outline on the side facing one arcuate end of the intermediate chain link, the projections (11,12;25,26;31,32,36,37) gripping said intermediate chain link in each case being formed by parts which can move relative to one another during assembly but are locked when in the operating position, and the other of the projections (12;26;32;37) having an arcuate outline on its side facing the other arcuate end of the intermediate chain link.

2. A chain conveyor as claimed in claim 1, wherein the root ends of both projections (11, 12; 25, 26; 31, 32; 36, 37) are provided with flanges (15, 16; 27, 28; 33, 34; 38, 39) for fixing them to one conveyor element (7) in each case.

3. A chain conveyor as claimed in claim 2, wherein each flange (15, 16; 27, 28; 33, 34; 38, 39) has bores (17) which serve to receive fixing bolts (18).

4. A chain conveyor as claimed in claims 1 or 2, wherein the sides (24), having arcuate outlines, of the projections (11,12;25,26;31,32;36,37) form centering recesses for the arcuate ends (8,9) of the intermediate chain link (10) gripped by them.

5. A chain conveyor as claimed in claims 2 or 3, wherein the flanges (15, 16; 27, 28; 33, 34; 38, 39) at least partially overlap.

6. A chain conveyor as claimed in claim 5, wherein the flanges (15, 16; 27, 28) overlap in the region of their bores (17).

7. A chain conveyor as claimed in claims 2 or 3, wherein the flanges (33, 34; 38, 39) are mounted to be pivotable about an axis.

8. A chain conveyor as claimed in claim 2, wherein the flanges (15, 16) can be clamped in between the arms (20, 21) of a U-shaped holding rail (22).

9. A chain conveyor as claimed in claim 3, wherein the flanges (27, 28) can be bolted to the longitudinal web (29) of a T-shaped holding rail (30).

10. A chain conveyor as claimed in claims 8 or 9, wherein the holding rails (22) ae fitted on a carrier (23) which in each case is rigidly joined to a conveyor element (7).

11. A chain conveyor as claimed in claims 1 or 2, wherein the mutual spacing of the projections (11, 12; 25, 26; 31, 32; 36, 37) can be increased to enable them to be assembled.

* * * * *

UNITED STATES PATENT AND TRADEMARK OFFICE
CERTIFICATE OF CORRECTION

PATENT NO. : 4,320,827
DATED : March 23, 1982
INVENTOR(S) : Puppel, et al.

It is certified that error appears in the above—identified patent and that said Letters Patent is hereby corrected as shown below:

On the first page of the above-identified patent, below "Foreign Application Priority Data": Delete "Jun. 19, 1980" and substitute -- Jun. 19, 1979 -- .

Signed and Sealed this

Twenty-fifth Day of May 1982

[SEAL]

Attest:

Attesting Officer

GERALD J. MOSSINGHOFF

Commissioner of Patents and Trademarks